United States Patent [19]

Ortelli

[11] Patent Number: 5,664,743
[45] Date of Patent: Sep. 9, 1997

[54] DEVICE FOR GRIPPING, GUIDING AND TRANSPORTING WHEELED HELICOPTERS PARTICULARLY FOR SHIP'S DECKS

[75] Inventor: Aurelio Ortelli, Bologna, Italy

[73] Assignee: Riva Calzoni S.p.A., Bologna, Italy

[21] Appl. No.: 362,154

[22] Filed: Dec. 22, 1994

[30] Foreign Application Priority Data

Dec. 30, 1993 [IT] Italy ................................ MI93A2765

[51] Int. Cl.$^6$ .......................................... B64C 25/50
[52] U.S. Cl. ..................... 244/50; 244/17.17; 244/115; 244/116; 414/751
[58] Field of Search ................................. 244/115, 116, 244/50, 17.17; 414/751, 429, 458; 901/16; 294/119.1

[56] References Cited

U.S. PATENT DOCUMENTS

| | | |
|---|---|---|
| 4,123,020 | 10/1978 | Korsak . |
| 4,132,318 | 1/1979 | Wang et al. .............................. 901/16 |
| 4,834,321 | 5/1989 | Granger ................................. 244/115 |
| 5,248,115 | 9/1993 | Aurelio ................................. 244/115 |

FOREIGN PATENT DOCUMENTS

| | | |
|---|---|---|
| A-0 518 405 | 12/1992 | European Pat. Off. . |
| A-1 334 800 | 10/1973 | United Kingdom . |

Primary Examiner—Andres Kashnikow
Assistant Examiner—Tien Dinh
Attorney, Agent, or Firm—Herbert Dubno

[57] ABSTRACT

A device for gripping, guiding and moving wheeled-type helicopters, particularly on board ships, platforms and the like, comprising a pair of crossmembers (6) located parallel to longitudinal axis (X—X) of the vessel and capable of moving transversally to such axis, in engagement with corresponding means of transverse guidance (2) integral with the ship's deck (3), each under the action of appropriate means of operation (7,8a, 8'a), independent of one another, and of further means of movement (12, 13) parallel to the longitudinal axis of the vessel, in engagement with corresponding longitudinal means of guidance (1), there being also provided a gripping and lifting arrangement (10,100) integral with each crossmember (6) and capable of moving in relation to the latter in order to grip, lift and guide the helicopter after landing, irrespective of its relative position with respect to deck (3) and its orientation with respect to longitudinal axis (X—X) of the vessel, and to position it in alignment with at least one of such longitudinal means of guidance (1).

10 Claims, 2 Drawing Sheets

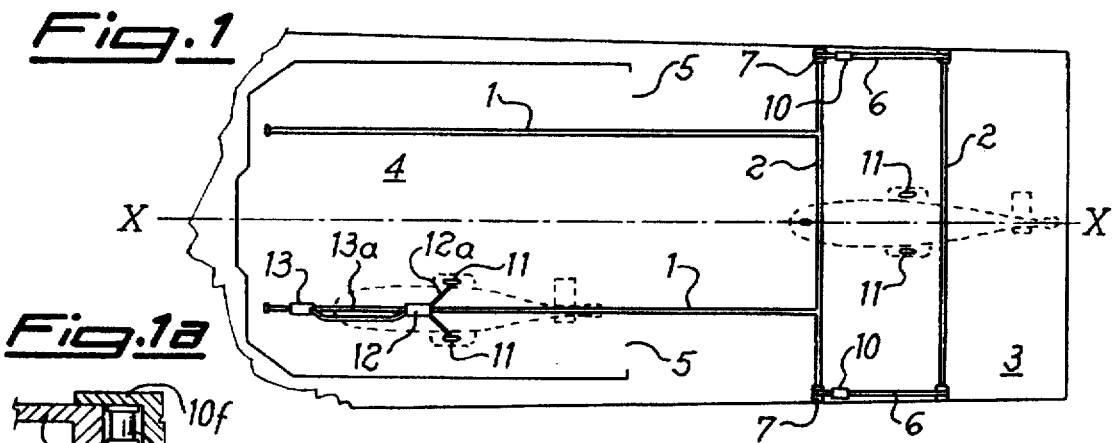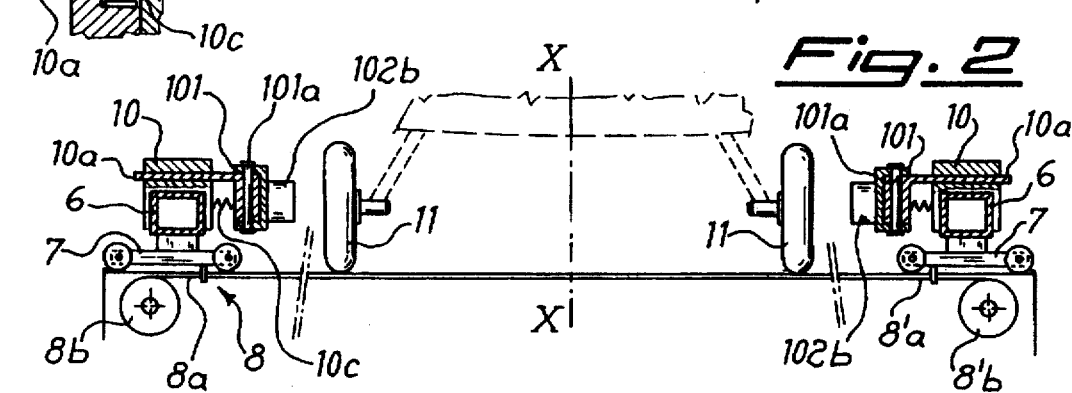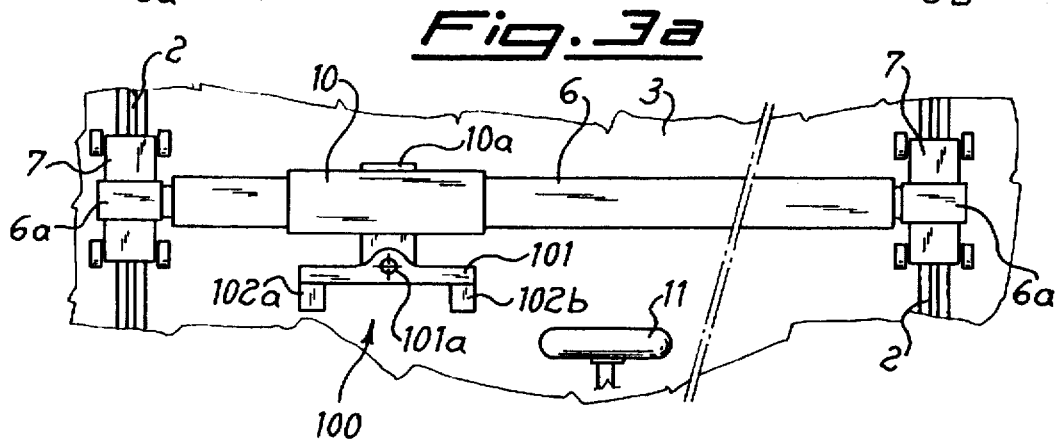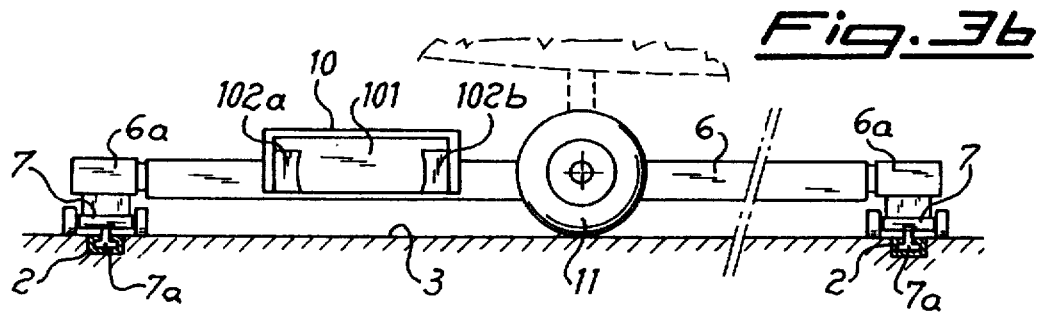

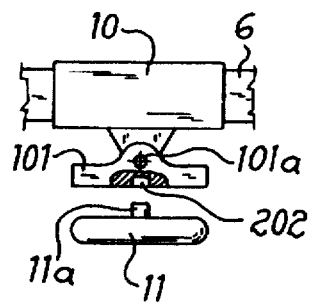
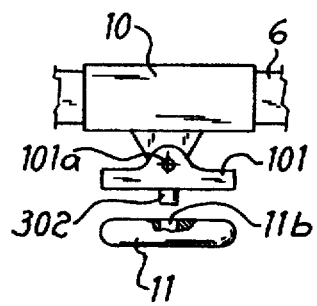
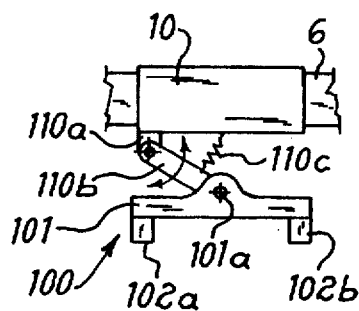
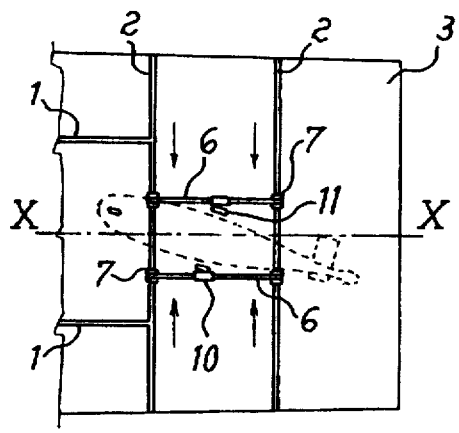
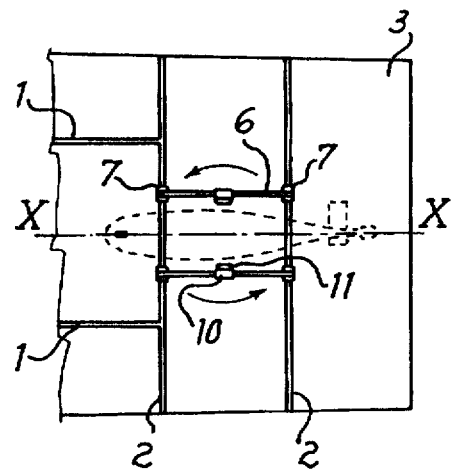
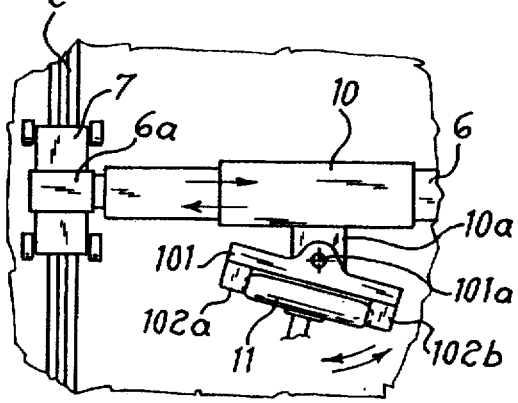
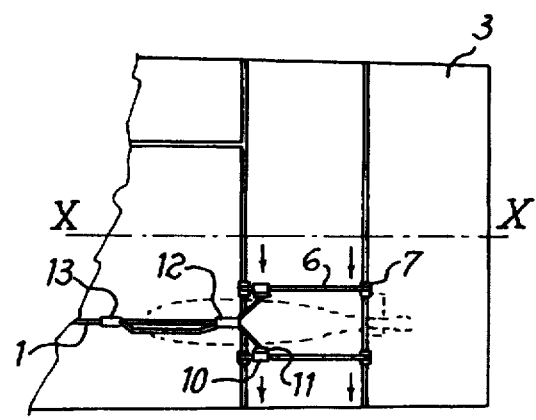

DEVICE FOR GRIPPING, GUIDING AND TRANSPORTING WHEELED HELICOPTERS PARTICULARLY FOR SHIP'S DECKS

SPECIFICATIONS

1. Field of the Invention

The present invention relates to an improved device for gripping, guiding and handling wheeled-type helicopters, particularly on board ships, platforms and the like.

2. Background of the Invention

The widespread use of shipborne helicopters creates the need to provide for the movement of a helicopter from a landing area located on deck to the interior of a hangar situated on the ship's deck.

Such an operation however, particularly complicated because of numerous factors which determine high unpredictability both of the landing position on the deck and of the relative positions of the helicopter, the deck and the entrance to the hangar. In addition to this, the manoeuvre should be capable of being performed with absolute safety both for the helicopter and for the crew, even under very hazardous conditions brought about, for example, by high winds and/or heavy seas which cause pitching and rolling of the vessel and can upset the balance of the helicopter.

There are also known systems which provide for the use of a wheeled truck placed on deck and movable in a direction substantially parallel to the longitudinal axis of the ship, to which the helicopter should be hitched after landing so that such truck may, by means of suitable arrangements, carry the helicopter to the hangar. Such arrangements, however, display certain disadvantages including the fact that it is particularly difficult, especially under unfavorable weather conditions, for the helicopter to be gripped by the truck when, after landing, the helicopter is in an offset position with its longitudinal axis turned away from the longitudinal axis of the ship. There is also known from publication EP 0 518 405 (see also U.S. Pat. No. 5,248,115 issued 28 Sep. 1993) a device for gripping, handling and transporting helicopters, particularly on board ships, platforms and the like, comprising a pair of gripping components set parallel to the longitudinal axis of the vessel and capable of moving transversely to such axis, in engagement with corresponding means for transverse guidance secured to the deck, and capable of being located in a tilted position, but parallel to one another, in relation to such means of guidance, under the action of operating means of independent of one another.

This device makes it possible to move the helicopter in the correct position so that it may be subsequently hitched by the truck for the longitudinal journey toward the hangar. Such device is particularly versatile and capable of being used both for helicopters of the skid type and for helicopters of the wheeled type. In the application associated with wheeled-type helicopters, however, the device is equipped with unsuitable mechanisms, drives and relevant control systems.

OBJECTS OF THE INVENTION

It is the object of the present invention to provide a simple and reliable device capable of moving a wheeled-type helicopter from any position within a well-defined landing area on a ship's deck to a position of correct orientation and alignment in relation to longitudinal guides provided on the deck of the said ship, for subsequent hitching by the truck responsible for transport to the hangar, such operation being carried out made easily and reproducibly irrespective of the relative position of the helicopter inside the landing area and in relation to the longitudinal axis of the vessel.

Another object is to enable such operations automatically and/or manually, but without any operating crew stationed on deck in the vicinity of the landing area.

SUMMARY OF THE INVENTION

These objects are obtained with the present invention, which provides an improved device for gripping, handling and transporting wheeled-type helicopters, particularly on board ships, platforms and the like, comprising a pair of crossmembers arranged parallel to the longitudinal axis of the vessel and capable of moving transversely to such axis, in engagement with corresponding means for transverse guidance integral with the ship's deck. Each crossmember is moved by appropriate operating means independently of the other, there also being provided further means for movement parallel to the longitudinal axis of the vessel, in engagement with corresponding longitudinal means for guidance. The device also includes a gripping and lifting arrangement integral with each crossmember and capable of moving in relation to the latter in order to grip, lift and guide the helicopter, as well as means for the operation and control of the entire device, both manual and automatic, the device making it possible to move the helicopter from the landing area irrespective of its relative position with respect to the deck and its orientation with respect to the longitudinal axis of the vessel, and to turn it and position it in alignment with at least one of such longitudinal means of guidance in order to take it into the hangar.

In a preferred embodiment, the gripping arrangement for a carriage capable of moving parallel to the crossmember under the action of appropriate means. The carriage is provided, via appropriate connection means with a plate on which are arranged means for gripping the helicopter wheels, the guide being capable of rotating in relation to the carriage around an axis perpendicular to the plane of the deck for the alignment thereof with the wheels of the helicopter irrespective of their position in relation to the longitudinal axis of the vessel.

BRIEF DESCRIPTION OF THE DRAWING

The above and other objects, features, and advantages will become more readily apparent from the following description, reference being made to the accompanying drawing in which:

FIG. 1 is a schematic plan view of the wheeled helicopter, gripping turning and moving arrangement according to this invention;

FIG. 2 is a schematic cros-section of the helicopter gripping arrangement with appropriate means for handling;

FIG. 3a is a plan view of gripping and lifting component;

FIG. 3b is a side view of the gripping component shown in FIG. 3a;

FIGS. 4a and 4b are detail views, partly broken away, of two alternative embodiments of the helicopter gripping and lifting arrangements;

FIGS. 5a, 5b and 5c are diagrams of successive stages in the operational sequence of gripping, turning and alignment of the helicopter;

FIG. 5d is a detail from FIGS. 5a–5c; and;

FIG. 6 is a view similar to FIGS. 4a and 4b of an alternative embodiment of the guiding component of the helicopter wheel gripping arrangements.

SPECIFIC DESCRIPTION

As shown in FIG. 1, the helicopter gripping and transporting device according to the invention is essentially comprised of a first pair of longitudinal rails 1 and of a second pair of transverse rails 2 made integral with deck 3 of the ship, on which is also located a hangar 4 entrances 5 of which are symmetrically aligned to each longitudinal rail 1.

Such rails 2 (FIG. 3b) are of substantially inverted T section in order to accommodate a corresponding sliding component and prevent disengagement thereof.

At each end of the pair of transverse rails 2, whose ends are substantially at the outer edges of the deck there, is provided a crossmember 6 located parallel to the longitudinal axis X—X of the vessel. The ends 6a of the cross members 6 are connected with trucks 7 capable of sliding on the deck in rails 2 via suitable links 7a (FIG. 3b) which prevent the trucks from tilting.

Trucks 7 are driven by two-way hauling devices of a rope type shown in outline at 8 and consisting, in the example, of two cables 8a, 8'a, one of which is the driving cable and the other the driven cable, leading via return pulleys 8b, 8'b to suitable motor-driven winches, not shown in the drawing, and being such as to make it possible to haul in the truck both directions, the rope being always maintained taut.

As shown in FIGS. 3a, 3b, each crossmember 6 is associated with a carriage 10, normally located at one of the ends of the crossmember and sliding on it under the action of a suitable operating means not shown in detail. Such carriage 10 has an inverted L component 10a capable of sliding horizontally in relation to the carriage in a direction orthogonal to axis X—X of the vessel, under the pushing action exerted by appropriate means, for example flexible means as shown in outline in FIG. 2 at 10c. To the component 10a are hinged gripping means 100 consisting of a plate 101 attached to a flange of component 10a by means of a pin 101a axis of which is orthogonal to the surface of the deck.

Plate 101 carries two gripping components 102a and 102b substantially shaped in the form of curved or flat jaws, the first being fixed and capable of sliding on plate 101 parallel to crossmember 6 and the second being capable of entering into engagement with wheels 11 of the helicopter so as to be able to handle the latter as will become more clearly apparent later.

In order to cause the gripper 100 to be lifted or lowered in a direction orthogonal to the plane of the deck and relative to carriage 10 there is also provided an arrangement (not shown in the figures) which may for example be comprised of a hydraulic cylinder interposed between inverted L-shaped component 10a and carriage 10 or between component 10a and member 101. Such arrangement comes into operation once the gripping components have engaged helicopter wheels 11 in order to lift them off the surface of the deck.

The device according to the invention furthermore provides a longitudinal travelling arrangement for the move into the hangar, substantially consisting of a first truck 12 provided with components 12a to hitch the helicopter and capable of running on idle wheels under the hauling action imparted by a second motor-driven truck 13 linked to the first by a rigid bar 13a, such device being self-evident and therefore shown only in outline in FIGS. 1 and 5c.

The device according to the invention also provides for each drive to be able to be operated and controlled remotely by the operator either manually or by means of automatic programs.

The operation of the device described with reference to FIGS. 5a, b, c is as follows: when the helicopter lands on deck 3, within the landing area and with its own longitudinal axis turned away from axis X—X of the vessel, the operator stationed at a distance operates crossmembers 6 which move in parallel until they reach the vicinity of wheels 11, at a preset distance from which the crossmembers are brought to a halt. At this stage is operated the forward movement of carriages 10, each of which moves along appropriate crossmember 6 actuated by its own drive until it is located substantially facing wheel 11, thus causing stoppage of movement of the carriage 10 relative to the respective crossmember 6. At this stage the forward movement of component 10a is initiated to place plate 101 in contact with wheel 11 which contact is enhanced by the free rotation of such plate 101 around pin 101a which brings about the effective striking of the plate against wheel 11. When plate 101 strikes against wheel 11 there is brought about the sliding of moving jaw 102b against fixed jaw 102a with consequent gripping of the wheel (FIG. 5a).

It is therefore obvious that there is thus always ensured the gripping of the wheels of the helicopter even where the latter lands in an offset position with respect to the longitudinal axis of the vessel. When the wheel is gripped by components 102a, 102b the arrangement for the lifting of the gripper 100 is actuated to lift wheel 11 off the deck. The carriages 10 are then displaced to rotate the helicopter to enable it to be carried with its longitudinal axis parallel to the longitudinal axis of the vessel (FIG. 5b).

A subsequent combined movement of crossmembers 6 places the helicopter in alignment with the rail 1 corresponding to the preselected hangar (FIG. 5c).

When the helicopter is correctly positioned there is operated motor-driven truck 13 which places gripping truck 12 under the fuselage of the helicopter so as to be able to actuate arms 12a which lock the helicopter via suitable connections located on the wheel axles. At this stage the gripping crossmembers 6 disengage and return to the starting position, while motor-driven truck 12 tows the helicopter into the hangar.

Many variants may be introduced without thereby departing from the scope of the invention in regard to its general features. In particular, as illustrated in FIGS. 4a and 4b respectively, the components used to grip wheels 11 of the helicopter may be comprised (FIG. 4a) of a seat 202 provided in plate 101 and capable of becoming coupled with a corresponding pin 11a projecting coaxially from the hub of wheel 11, or conversely by a pin 302 projecting from plate 101 and capable of becoming coupled with a corresponding seat 11b in wheel 11. As shown in FIG. 6, alternative provision is also made for such gripping means 100 to consist of a fixed eye 110a, integral with carriage 10, to which is hinged one end of a connecting rod 110b, the other end of which is hinged via pin 101a to plate 101. Again in this case the operation of the gripping means is alike to that described above, the forward movement of plate 101 toward wheel 11 being capable of being achieved by flexible means 110c (shown in outline in the drawing), the pushing action of which is made possible at the time of positioning of crossmember 6 and carriage 10 in relation to wheel 11.

I claim:

1. A device for displacing a helicopter on a ship or platform having a deck, comprising:

at least one longitudinal guide forming a path for a helicopter leading to a parking location;

means forming a transverse guide extending perpendicular to said longitudinal guide;

a pair of crossmembers extending generally parallel to said longitudinal guide and transverse to said transverse guide;

means for displacing said crossmembers independently along said transverse guide to approach said crossmembers to a helicopter disposed between said crossmember;

respective carriages mounted on the crossmembers;

means for independently displacing said carriages along said crossmembers to a gripping position in juxtaposition with opposite portions of the helicopter disposed between said crossmembers;

respective support plates on said carriages displaceable laterally of said carriages and transverse to said longitudinal guide and formed with free ends facing one another;

respective gripping means on free ends of the plates pivotal exclusively about respective axes extending perpendicular to the deck and in a plane parallel to the deck and engageable with the portions of the helicopter in said gripping position in any position of the helicopter portion relative to a longitudinal axis of the deck, thereby seizing said helicopter for further shifting;

flexible means on said carriages for biasing said support plates inwardly toward said opposite portions of the helicopter in said gripping position during displacing the helicopter laterally and rotatably upon lifting so that a longitudinal axis thereof is parallel to and aligned with said longitudinal guide; and means displaceable along said longitudinal guide for receiving said helicopter from said gripping means when said helicopter has been shifted toward said longitudinal guide to displace said helicopter to said parking location.

2. The device as defined in claim 1 wherein said longitudinal guide comprises two spaced apart parallel rails extending parallel to a longitudinal axis of said deck, said transverse guide being a pair of mutually parallel spaced apart rails perpendicular to the rails of said longitudinal guide, said cross members having on its end that is trucks displaceable along the rails of said transverse guide and actuated by pairs of ropes engaged by motor driven wheels.

3. The device as defined in claim 2 wherein said rails transverse form inverted T-shaped guides in which a T-shaped component is engageable to limit tiling of trucks displaceable along said rails.

4. The device as defined in claim 1 wherein said support plate is connected to said carriage by a fixed eye, another end of said plate being provided with a pin, said flexible means being connected to said support plate for displacing same relative to said carriage.

5. The device as defined in claim 1 wherein each of said gripping means has a seat receiving a pin projecting coaxially from a rib or a respective helicopter wheel.

6. The device as defined in claim 1 wherein each of said gripping means has a pin engageable in a recess in a hub of a respective helicopter wheel.

7. The device as defined in claim 1 wherein said means displaceable along said longitudinal guide includes a pair of trucks including a motor driven truck, an idler truck, articulated to said motor driven truck and means of said idler truck for locking with and lifting said helicopter.

8. The device as defined in claim 1 wherein said gripping means on each of the carriages includes:

a pin mounted on said free end of the support plates;

an abutting plate mounted rotatably on said pin;

a fixed jaw and a movable jaw displaceable toward said fixed jaw on said abutting plate and extending generally in a plane transverse said longitudinal guide; and lifting means for elevating wheels of said helicopter of off said deck.

9. The device as defined in claim 1 wherein each of said lifting means is mounted between the support and abutting plates.

10. The device as defined in claim 8 wherein each of said lifting means is powered a hydraulic cylinder.

* * * * *